United States Patent

[11] 3,603,534

[72] Inventor Richard Kenneth Barltrop
Rochester, Kent, England
[21] Appl. No. 848,031
[22] Filed Aug. 6, 1969
[45] Patented Sept. 7, 1971
[73] Assignee Elliott Brothers (London) Limited
London, England
[32] Priority Aug. 10, 1968, Nov. 18, 1968
[33] Great Britain
[31] 38338/68 and 54583/68

[54] SYNCHRONIZED POWER CONTROL
6 Claims, 5 Drawing Figs.
[52] U.S. Cl. .................................................. 244/78
[51] Int. Cl. .................................................. B64c 13/36
[50] Field of Search ........................................ 244/78, 76,
79, 90, 83 R, 83 C, 83 D, 83 E, 77 R, 77 F, 77 V,
77 S, 77 E

[56] References Cited
UNITED STATES PATENTS
2,953,325 9/1960 Hadekel ........................ 244/83 X
3,003,719 10/1961 Summerlin et al. ............ 244/76
3,021,097 2/1962 Hecht ........................... 244/78 X FOREIGN PATENTS
777,938 7/1957 Great Britain ................

Primary Examiner—Milton Buchler
Assistant Examiner—F. K. Yee
Attorney—Kirschstein, Kirschstein, Ottinger & Frank ABSTRACT: The invention is concerned with overcoming spurious operation of force limiter devices included in linkages associated with individual actuator lanes respectively controlling the portions of a split control surface of an aircraft in response to electrical signals supplied to the actuator lanes and to manual movement of a control run of the aircraft. Such spurious operation of the force limiters arises as a result of manufacturing tolerances in the circuitry supplying the electrical signals. The problem is solved by providing in the linkages breakout springs connected to respective ones of the linkages and each of which has a force threshold which is less than that of the force limiter devices and chosen so that disparities in commanded ram positions due to differences in the command signals due to tolerance buildup, may be accommodated by the breakout springs without causing disengagement of a force limiter device from a linkage.

FORCE/DEFLECTION
CHARACTERISTIC OF
FORCE LIMITER 21

CHARACTERISTIC OF
BREAK-OUT SPRING 47

INVENTOR
RICHARD KENNETH BARLTROP

BY Furshetein, Kanchelein Ottinger & Frank
ATTORNEYS

SYNCHRONIZED POWER CONTROL

This invention relates to aircraft flight control systems, hereinafter referred to as being "of the type described," for an aircraft provided with a split control surface and a signal source or signal sources operable to develop, on separate channels, command signals for controlling respective portions of the split surface, in which, with the signal source or sources disabled from controlling the surface portions, movements of a manual control member are transmitted, by a control run, against artificial feel, to the split control surface, by way of a power amplification arrangement and, with the signal source or sources enabled for controlling the surface portions, the control member is moved, against artificial feel, by movement of the control run, so as to follow movements of the control surface.

The power amplification arrangement may comprise a plurality of actuator lanes respectively associated with the command signal channels. Each of the channels includes a hydraulic ram, movement of which drives a portion of the split surface, and an associated valve gear for controlling the supply of hydraulic fluid to the ram. A common input member is connected to the control run. Linkages, all connected to the common input member, are individually connected to the rams and to their associated valve gears and include individual overload devices. There is a plurality of force limiter devices, having substantially identical force thresholds, which are respectively associated with the linkages and, depending on whether or not the signal source or sources is, or are, enabled for, or disabled from controlling the supply of fluid to the rams, simultaneously operable to restrain or to free the linkages so as to prevent operation of the valve gears by movement of the linkages. A plurality of actuators are respectively connected to the linkages and, with the signal source or sources enabled, receive control signals from respective control signal channels. A plurality of pickoffs are operable to develop output signals representing the movement of respective valve gears by the actuators and linkages. A second plurality of pickoffs are operable to develop output signals representing movement of respective rams, under control of the valve gears. In each command signal channel, a signal-summing arrangement receives a command signal, derived from the signal source or sources and nominally the same as the command signals on the other command signal channels, together with pickoff output signals and, in response to these signals, controls the associated actuator so that, under the control of its associated valve gear, the ram takes up a position dictated by the command signal.

In the event of a failure in an actuator lane, due, for example, to a sticking valve, the ram of the failed lane is unable to take up its commanded position and the position of the split control surface which is moved by the ram of the failed lane, cannot move in sympathy with the remainder of the control surface portions. By providing, in each actuator lane, an overload device which has a suitable breakout force the failed actuator lane is effectively isolated from the remaining lanes and these latter lanes may be operated so as to move their respective portions of the split control surface so that the aircraft is placed in a fail operative state.

With the signal source or sources enabled, the ram moves in response to its command signal. In moving, the ram moves its associated linkage. If there is a runaway in a command signal the movement of a linkage by the ram gives rise to a force which acts on the force limiter, engaged with a linkage, and is in excess of the breakout force of the limiter. With the force limiter disengaged there is a mechanical feedback, via the linkage, to the valve gear so that the valve gear shuts off the supply of fluid to the ram so as to enable the associated portion of the split surface to take up a fail passive position.

The system above described presupposes that the command signals are equal in magnitude. In practice this is not achieved; the command signal channels differ as a result of tolerance buildups. Such differences are liable to give rise to a situation in which the force limiters behave spuriously.

According to the present invention there is provided an aircraft control system of the type described in which the power amplification arrangement comprises a plurality of actuator lanes which are respectively associated with the command signal channels and each of which includes a hydraulic ram, movement of which drives a portion of the split surface, and an associated valve gear for controlling the supply of fluid to the ram; a common input member connected to the control run; linkages, all connected to the common input member and individually connected to the rams and to their associated valve gears and each including an overload device; a plurality of force limiter devices, with substantially identical force thresholds which are respectively associated with the linkages and, depending on whether the signal source is engaged or disengaged, simultaneously operable to restrain or to free the linkages so as to permit or to prevent operation of the valve gears by the linkages; a plurality of actuators which are respectively connected to the linkages and to the control signal channels; a first plurality of pickoffs which, when the signal source is engaged are operative to develop output signals representing movement by the actuators and linkages of respective valve gears; a second plurality of pickoffs which, when the signal source is engaged, are operative to develop output signals representing movements under the control of the valve gears, of respective rams; in each command signal channel, a signal-summing arrangement which receives a command signal, derived from the signal source or sources, and nominally the same as a command signal on the other command signal channels, together with pickoff output signals, representing movements of a ram and its associated valve gear and, in response to these signals, controls the associated actuator so that, under the control of its associated valve gear, the ram takes up a position dictated by the command signal; and a plurality of breakout springs connected to respective ones of the linkages and each of which has a force threshold which is less than that of the force limiter devices and chosen so that disparities in commanded ram positions due to differences in the command signals due to tolerance buildup, may be accommodated by the breakout springs without causing disengagement of a force limiter device from a linkage.

The plurality of breakout springs may comprise individual springs; or they may be embodied in the overload devices. In the latter event the overload devices must have a characteristic which satisfies the desired operation of the system both in the manual control mode and in response to derived command signals.

An embodiment of the invention is hereinafter described with reference to the accompanying drawings in which.

Figure 1:
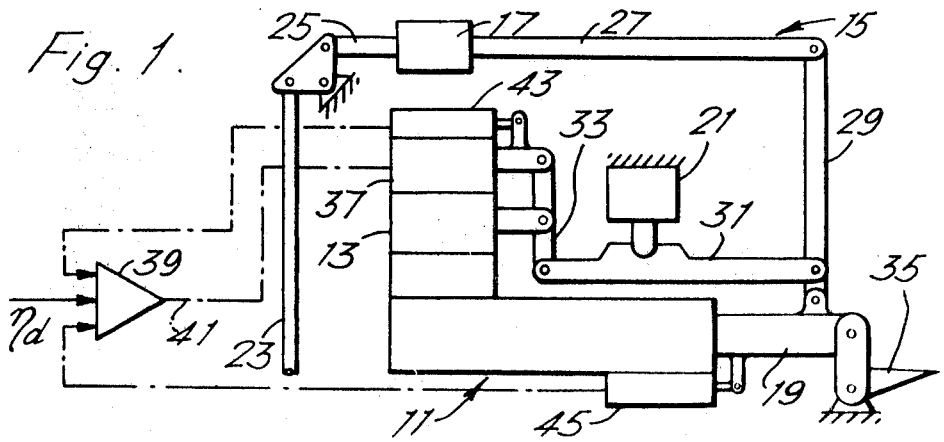
FIG. 1 is a block schematic diagram showing a power control of a known flight control system.

The known power control (FIG. 1) comprises a hydraulic ram and cylinder arrangement 11, and a valve gear 13, a linkage 15 which includes an overload device 17, and is connected to the ram 19 of the ram and cylinder arrangement 11, and a force limiter device 21 which is movable into or out of engagement with the linkage 15 so as to restrain or free the linkage.

The linkage 15 comprises an input member 23, which is connected to a control run (not shown in Fig. 1), itself connected to a manual control member (not shown), members 25 and 27 on either side of the overload device 17, a member 29 connected to the member 27 and to the ram 19, a member 31 connected at one end to the member 29 and at the other end to a member 33 connected to the valve gear 13.

With the force limiter 21 disengaged from the linkage 15, movement of the link member 23 in response to manual movement of the control member, acts, by way of the link member 25, the overload device 17, the link member 27, and the link members 29, 31 and 33, so as to operate the valve gear 13. The valve gear admits hydraulic fluid, under pressure, to the ram 19. The ram 19, in moving, moves the links 29, 31 and 33 so as to reset the valve gear thereby cutting off the supply of further fluid to the ram. The position taken up by the ram therefore corresponds to the manual command applied to the control member. A control surface 35 connected to the ram 19 takes up a position determined by the ram position.

With the force limiter 21 engaged with the link member 31, commands are introduced into lane by way of an actuator 37. The commands are represented by signals, for example electrical signals from, say, an autopilot carried by the aircraft. In the embodiment the surface 35 is an elevator surface which is to be controlled, as to position, by pitch command signal $\eta_d$. The latter signal is applied to a summing amplifier 39 which develops on command signal channel 41 an amplified version of the command signal. The actuator 37 is connected to the link member 33 and moves in response to the command signal so as, via the link member 33, to operate the valve gear 13. As before, the valve gear, which is rapidly set in accordance with the command signal, controls the supply of fluid to the ram and cylinder arrangement 11 so as to drive the ram.

There is a first pickoff 43 associated with the actuator 37; there is a second pickoff associated with the ram and cylinder arrangement 11. The first pickoff 43 develops an output signal proportional to valve position, that is to say ram velocity; the second pickoff 45 develops an output signal proportional to ram position. The graphs (FIG. 3) show idealized response of the two pickoffs to a step command $\eta_d$. The output signals from the pickoffs are combined in the summing amplifier 39 with the command signal $\eta_d$.

Figure 3:
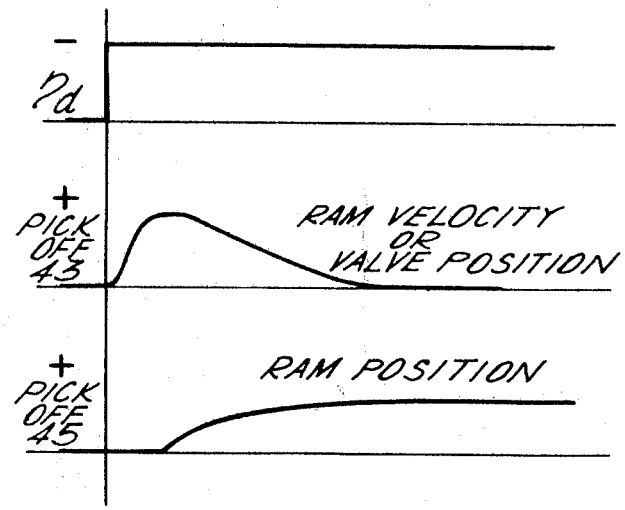
FIG. 3 is a set of graphs showing the general form of signals developed in the flight control systems of FIGS. 1 and 2 in response to a step command.

As indicated in FIG. 3, the valve gear 13 responds rapidly to the command signal $\eta_d$. As the ram moves the pickoff 45 develops an exponentially increasing signal which combines with the command signal $\eta_d$ so that the signal applied to the actuator 37 decays. Output signals from the pickoffs 43 and 45 are applied degeneratively to the summing amplifier. In the result, when the ram 19 has attained the commanded position, the signal applied to the actuator 37 is at a null.

In the event of a runaway of command which may be due, e.g. to a runaway in the signal $\eta_d$, or to failure in one of the pickoffs, force limiter 21 is subjected, by the link member 31, to a force in excess of its breakout force. The linkage 15 being then freed from the restraint of the force limiter 21, is able to act on the valve gear 13 so as to cut off supply of fluid to the ram 19 thereby preventing the ram from being driven hard up against a stop.

Movements of the ram 19 in response to a command signal $\eta_d$ act, by way of the linkage 15, so that the control run moves the manual control member. The position of the latter member therefore follows movement of the control surface. Movement of the control run either in response to manual inputs to the control member or in following control surface movement is against the bias of an artificial feel unit connected to the control run.

A more detailed description of the basic system, outlined above, is given in the specification of U.S. Pat. 777,938.

Figure 2:
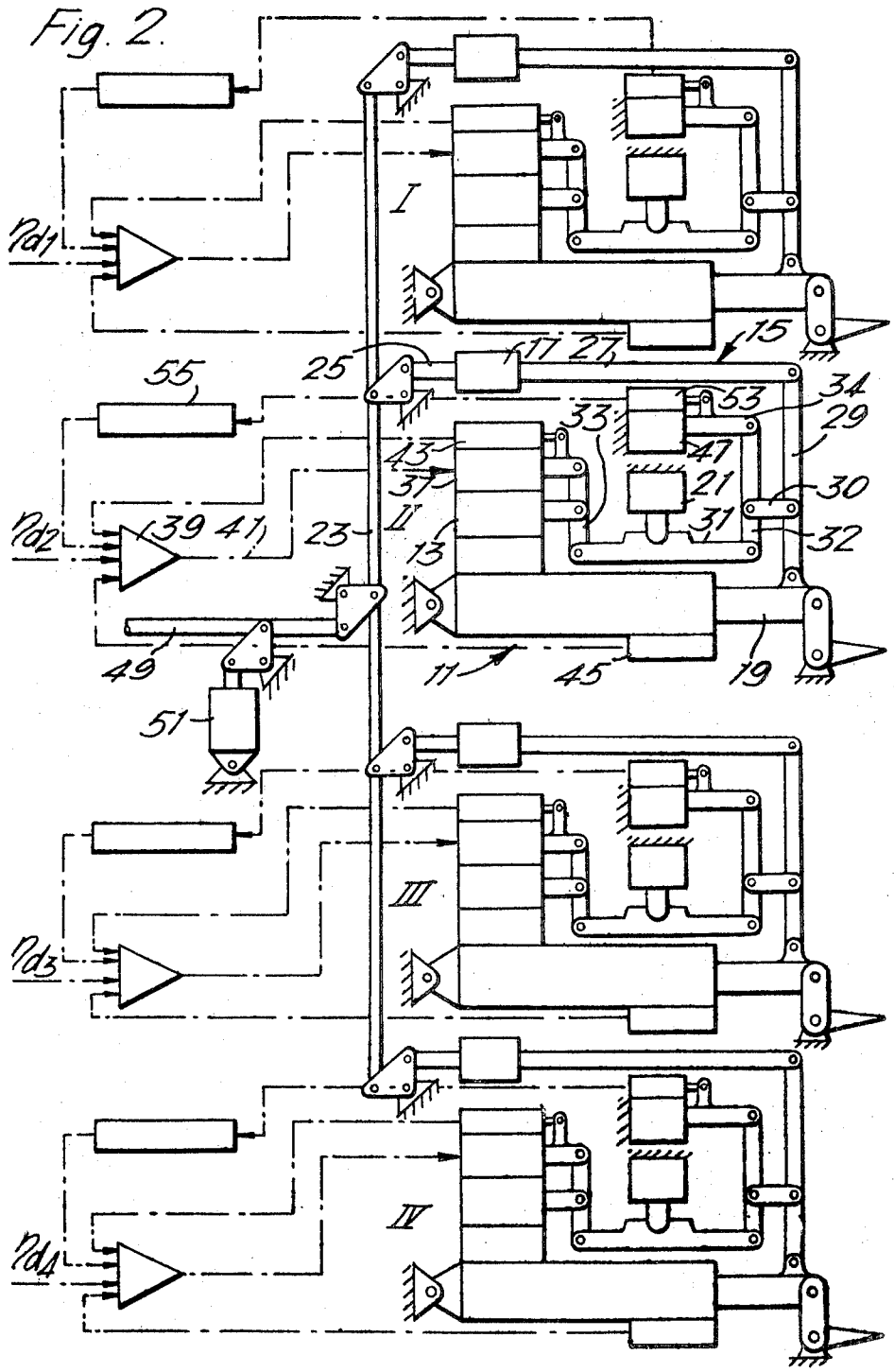
FIG. 2 is a block schematic diagram showing part of a flight control system in accordance with the present invention.

The full power amplification arrangement for a split control surface, in this embodiment a split elevator, is given in outline in Fig. 2. The member 23 of Fig. 2 is now common to each of the four essentially similar actuator lanes, I, II, III and IV which are respectively associated with the individual portions of the elevator and differ from the power control of Fig. 1 in that, in each lane, the link member 29 is connected to the member 31 by intermediate link members 30 and 32, by the provision of a breakout spring 47 connected to the link 32 by a member 34, and by the provision of a third pickoff 53 operable to develop output signals corresponding to deflection of the spring 47. The member 23 may be regarded as a common input member to all of the actuator lanes.

A portion 44 of control run, and an artificial feel unit 51 connected to the control run, are shown in Fig. 2. While, in the absence of failures, the source or sources, e.g. aircraft sensors and autopilot, develop the signals $\eta_{d_1}$, $\eta_{d_2}$, $\eta_{d_3}$, and $\eta_{d_4}$ (Fig. 2) of nominally identical magnitude, in practice there are disparities between the signals. Because of such disparities, which are due to tolerance buildup in the sensor circuitry utilizing the sensor signals, the demanded ram positions differ.

However the common input member 23 ensures that the link members 27 are, in normal circumstances fixed with respect to reference earth. Since the link members 27 and the ram 19 determine the position of link members 31, it follows that the individual link members 31 must take up different positions with respect to earth. This is possible only if one or more force limiter devices 21 disengage from the link members 31. When such disengagement occurs mechanical feedback is applied to the associated valve gear 13 in addition to the signal fed back from the ram pickoff 45.

With such an arrangement, because of the erratic operation of the force limiter devices 21, the motion of the individual rams 19 in response to command signals $\eta_d$ is jerky.

The breakout springs 47 ensure a smooth, precise control of the rams 19 in response to command signals $\eta_d$. The breakout springs 47 have substantially identical breakout characteristics; the breakout force of each spring 47 is less than that of the force limiters 21.

Figure 4:
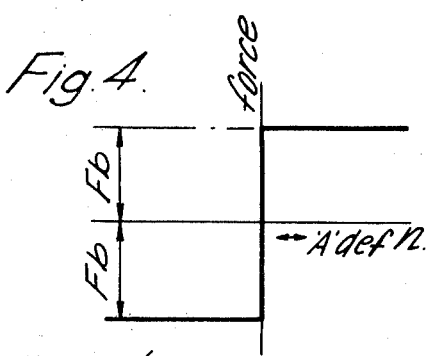
FIGS. 4 and 5 are graphs showing the force deflection characteristics of certain components of the system of Fig. 2.
Figure 5:
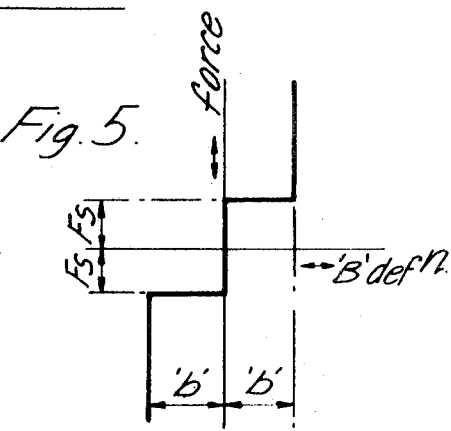

The breakout characteristic of each force limiter 21 is determined in accordance with the need to limit the authority of the system so as to meet safety requirements. The breakout force of each of the breakout springs 47 is always less than the breakout force of any one force limiter 21 and, in general, is such that the combined force threshold of any two breakout springs 47 is greater than the force threshold of a force limiter 21. By providing the breakout springs, as 47, in the power amplification arrangement a degree of synchronization of the separate portions of the split control surface is achieved notwithstanding disparities due to tolerance buildup in the aircraft sensors and signal paths leading to the summing amplifiers 39. Such disparities might be exemplified by differing values of the command signals $\eta_{d_1}$, $\eta_{d_2}$, $\eta_{d_3}$ and $\eta_{d_4}$. The breakout characteristics of the force limiters 21 and the breakout springs 47 are given in Figs. 4 and 5, respectively. The breakout springs 47 impose on the link member 34 an operating characteristic as shown in Fig. 5. The maximum allowable deflection from center is limited to $\pm b$ and a finite breakout force $Fs$ is required to break out the spring from its central position. The magnitude of the force $Fs$, referred to link member 31 is such that $Fs \geq \frac{1}{2}Fb$.

Associated with each of the breakout springs 47 there is a third pickoff 53; and associated with each of the latter pickoffs, there is an integrator 55. The integrators 55 receive signals from the pickoffs 53 and have their outputs respectively connected to the summing amplifiers 39.

It can be shown that the positions taken up by the link members 27 approximate to the mean of all the ram output positions provided that the breakout springs 47 are essentially identical in characteristic. The deflection of the link member 27 is, therefore, proportional to control surface asynchronism. The pickoffs 53 develop output signals proportional to deflection of the link members 34. These signals are fed back to the summing amplifiers via the integrators in a sense to move each ram 19 in a direction necessary to null the outputs of the pickoffs 53. By nulling the latter output signal substantially complete synchronization of the control surface portions is achieved.

Assume that a failure occurs such that a ram output is caused to run away out of synchronism with respect to the remaining three rams. Link member 27 of the linkage 15 associated with the failed lane, is held by the combined breakout characteristic of the breakout springs 47 of the three operative lanes, and, hence, may be regarded as rigid. In response to the failure the ram 19 of the failed lane takes its associated breakout springs 47 on to its stops and then breaks out its own force limiter device 21. Further movement of the ram 19 is therefore prevented.

The failure is passive and the system as a whole continues to operate without disconnection of the failed actuator lane.

Since a failure must result in the continuous compression of the breakout spring 47 associated with the failed lane, the integrator 55 associated with the failed lane must build up a large synchronization demand with time. A failure assessment amplitude for the integrator output signal can be fixed and when this is exceeded a warning may be presented to the crew by means of a comparator (not shown). This assumes that the system as a whole will not operate in a force-limited condition for long periods when, of course, all of the overload springs are compressed.

If normal operation of the system is to be expected under force-limited conditions for long periods, it is possible to display a warning derived from the overload springs 17 of the system. If all four warnings come up simultaneously the system may be assumed to be working satisfactorily. If only one comes on and remains on continuously a failure may be assumed to have occurred in that lane.

I CLAIM:
1. An aircraft control system, comprising:
   a. a manual control device;
   b. an autopilot;
   c. a plurality of main hydraulic rams for operating respective sections of a control surface of the aircraft;
   d. for each ram, a respective ram valve controlling the ram;
   e. for each ram, a respective actuator controlled by the autopilot;
   f. mechanical linkage means coupling the manual control device to each ram valve, each actuator to its respective ram valve, and each ram to the manual control device to bring the manual control device to a position corresponding to the ram position; and
   g. for each ram, a respective controllable coupling in the mechanical linkage means, operable by a manually applied override force and when the autopilot is inoperative to disable the coupling of the ram to the manual control device:
characterized by
   h. synchronizing means for each ram, in the mechanical linkage means, for permitting a predetermined degree of desynchronism between the ram position and the position of the manual control device.

2. An aircraft control system according to claim 1, wherein each synchronizing means has an electrical pickoff for indicating when the maximum permitted desynchronism occurs, and the resulting signal is integrated and combined with the autopilot signal for controlling the respective ram valve.

3. An aircraft control system according to claim 2, wherein each synchronizing device permits no desynchronism until the force between the respective ram and the manual control device exceeds a predetermined limit, and then permits desynchronism up to the predetermined degree without any further increase of force.

4. An aircraft control system according to claim 1, wherein:
   a. each controllable coupling comprises a first link and means operable to prevent longitudinal movement thereof unless a predetermined force is exceeded, the first link being coupled to the ram valve; and
   b. the mechanical linkage further includes for each ram:
   c. a second link from the manual control device;
   d. a third link connected transversely between the first link and the ram; and
   e. a fourth link connected transversely between the synchronizing means the first link, and having an intermediate point coupled to an intermediate point of the third link.

5. An aircraft control system according to claim 4, wherein the first link is coupled to the ram valve via a fifth link to which the actuator is also coupled.

6. An aircraft control system according to claim 5, wherein each synchronizing device permits no desynchronism until the force between the respective ram and the manual control device exceeds a predetermined limit, and then permits desynchronism up to the predetermined degree without further increase of force, the said force being less than the force required to cause longitudinal movement of the first link when the respective controllable coupling is operated.